(12) United States Patent
Friesen et al.

(10) Patent No.: US 12,118,271 B2
(45) Date of Patent: Oct. 15, 2024

(54) PLAYLIST CONFIGURATION AND PREVIEW

(71) Applicant: Apple Inc., Cupertino, CA (US)

(72) Inventors: Sharon E. Friesen, San Jose, CA (US); Jorge S. Fino, San Jose, CA (US); Jason A. Skinder, Bloomfield, MI (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/929,657

(22) Filed: Sep. 2, 2022

(65) Prior Publication Data

US 2022/0413798 A1  Dec. 29, 2022

Related U.S. Application Data

(63) Continuation of application No. 15/174,753, filed on Jun. 6, 2016, now Pat. No. 11,435,979, which is a (Continued)

(51) Int. Cl.
*G06F 16/638* (2019.01)
*G06F 3/04817* (2022.01)
(Continued)

(52) U.S. Cl.
CPC .......... *G06F 3/167* (2013.01); *G06F 3/04817* (2013.01); *G06F 3/0482* (2013.01); (Continued)

(58) Field of Classification Search
CPC .... G06F 3/167; G06F 16/639; G06F 3/04817; G06F 3/0482; G11B 27/105;
(Continued)

(56) References Cited

U.S. PATENT DOCUMENTS

| 5,483,261 A | 1/1996 | Yasutake |
| 5,488,204 A | 1/1996 | Mead et al. |

(Continued)

FOREIGN PATENT DOCUMENTS

| CN | 101702317 A | 5/2010 |
| CN | 101743595 A | 6/2010 |

(Continued)

OTHER PUBLICATIONS

Corrected Notice of Allowance received for U.S. Appl. No. 15/174,753, mailed on Jul. 18, 2022, 2 Pages.
(Continued)

*Primary Examiner* — Beau D Spratt
(74) *Attorney, Agent, or Firm* — Kubota & Basol LLP

(57) ABSTRACT

In some implementations, a user can play a music track from a dynamically generated playlist. The user can provide input indicating that the user likes or dislikes the music track and the playlist can be adjusted based on the user input. In some implementations, information can be presented to the user so that the user can preview changes to the playlist before the changes are made to the playlist. In some implementations, a user can adjust playlist criteria (configuration) by adjusting specific music characteristics. In some implementations, a user can adjust playlist criteria by manipulating a list of representative music tracks. In some implementations, a user can compare the user's playlist to playlists of other users.

45 Claims, 11 Drawing Sheets

Related U.S. Application Data continuation of application No. 13/335,836, filed on Dec. 22, 2011, now Pat. No. 9,361,942.

(51) Int. Cl.

| | | |
|---|---|---|
| *G06F 3/0482* | (2013.01) | |
| *G06F 3/16* | (2006.01) | |
| *G11B 27/10* | (2006.01) | |
| *G11B 27/32* | (2006.01) | |

(52) U.S. Cl.
CPC .......... *G06F 16/639* (2019.01); *G11B 27/105* (2013.01); *G11B 27/329* (2013.01); *G10H 2220/106* (2013.01); *G10H 2240/081* (2013.01); *G10H 2240/085* (2013.01); *G10H 2240/131* (2013.01); *G10H 2240/251* (2013.01)

(58) Field of Classification Search
CPC .......... G11B 27/329; G10H 2220/106; G10H 2240/081; G10H 2240/085; G10H 2240/131; G10H 2240/251
See application file for complete search history.

(56) References Cited

U.S. PATENT DOCUMENTS

| | | | |
|---|---|---|---|
| 5,616,876 A | 4/1997 | Cluts | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,526,411 B1 | 2/2003 | Ward | |
| 6,570,557 B1 | 5/2003 | Westerman et al. | |
| 6,677,932 B1 | 1/2004 | Westerman | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,614,008 B2 | 11/2009 | Ording | |
| 7,633,076 B2 | 12/2009 | Huppi et al. | |
| 7,653,883 B2 | 1/2010 | Hotelling et al. | |
| 7,657,849 B2 | 2/2010 | Chaudhri et al. | |
| 7,663,607 B2 | 2/2010 | Hotelling et al. | |
| 7,725,829 B1 | 5/2010 | Wong et al. | |
| 7,802,004 B2 | 9/2010 | Orourke et al. | |
| 7,844,914 B2 | 11/2010 | Andre et al. | |
| 7,957,762 B2 | 6/2011 | Herz et al. | |
| 8,006,002 B2 | 8/2011 | Kalayjian et al. | |
| 8,239,784 B2 | 8/2012 | Hotelling et al. | |
| 8,279,180 B2 | 10/2012 | Hotelling et al. | |
| 8,381,135 B2 | 2/2013 | Hotelling et al. | |
| 8,479,122 B2 | 7/2013 | Hotelling et al. | |
| 8,700,795 B2* | 4/2014 | Boulter .................. | H04H 60/25 709/231 |
| 9,348,458 B2 | 5/2016 | Hotelling et al. | |
| 9,933,937 B2 | 4/2018 | Lemay et al. | |
| 2002/0015024 A1 | 2/2002 | Westerman et al. | |
| 2004/0019497 A1 | 1/2004 | Volk et al. | |
| 2005/0038819 A1* | 2/2005 | Hicken .................. | G11B 27/11 |
| 2005/0086638 A1 | 4/2005 | Farn | |
| 2005/0114374 A1 | 5/2005 | Juszkiewicz et al. | |
| 2005/0190059 A1 | 9/2005 | Wehrenberg | |
| 2006/0017692 A1 | 1/2006 | Wehrenberg et al. | |
| 2006/0026521 A1 | 2/2006 | Hotelling et al. | |
| 2006/0033724 A1 | 2/2006 | Chaudhri et al. | |
| 2006/0088292 A1 | 4/2006 | Guillen et al. | |
| 2006/0143236 A1* | 6/2006 | Wu .................. | G06F 16/4387 |
| 2006/0168340 A1 | 7/2006 | Heller et al. | |
| 2006/0197753 A1 | 9/2006 | Hotelling | |
| 2006/0218187 A1 | 9/2006 | Plastina et al. | |
| 2006/0272479 A1 | 12/2006 | Takatsuka et al. | |
| 2007/0168388 A1 | 7/2007 | Plastina et al. | |
| 2008/0019240 A1 | 1/2008 | Araki et al. | |
| 2008/0091717 A1 | 4/2008 | Garbow et al. | |
| 2008/0115173 A1 | 5/2008 | Ellis et al. | |
| 2008/0132187 A1 | 6/2008 | Hanebeck | |
| 2009/0094321 A1 | 4/2009 | Ueda et al. | |
| 2009/0150947 A1 | 6/2009 | Soderstrom | |
| 2009/0164641 A1* | 6/2009 | Rogers .................. | G06Q 30/02 709/227 |
| 2009/0187578 A1 | 7/2009 | Morita | |
| 2009/0249222 A1* | 10/2009 | Schmidt ............. | H04N 21/4143 713/400 |
| 2009/0320075 A1 | 12/2009 | Marko | |
| 2010/0023578 A1 | 1/2010 | Brant et al. | |
| 2010/0042595 A1 | 2/2010 | Chen et al. | |
| 2010/0070537 A1 | 3/2010 | Amidon et al. | |
| 2010/0162115 A1 | 6/2010 | Ringewald et al. | |
| 2010/0268361 A1* | 10/2010 | Mantel .................... | G06F 16/68 707/804 |
| 2010/0273610 A1 | 10/2010 | Johnson | |
| 2012/0117620 A1 | 5/2012 | Cassidy et al. | |
| 2012/0192112 A1 | 7/2012 | Garrison et al. | |
| 2012/0216296 A1* | 8/2012 | Kidron .................... | G06F 21/10 726/28 |
| 2013/0073280 A1* | 3/2013 | O'Neil .................... | G06F 40/20 704/E11.001 |
| 2013/0073584 A1* | 3/2013 | Kuper .................... | G06F 16/48 707/769 |
| 2013/0167029 A1 | 6/2013 | Friesen et al. | |
| 2016/0283192 A1 | 9/2016 | Friesen et al. | |

FOREIGN PATENT DOCUMENTS

| | | |
|---|---|---|
| JP | 2000-163031 A | 6/2000 |
| JP | 2002-342033 A | 11/2002 |
| KR | 10-2009-0035563 A | 4/2009 |
| KR | 10-2010-0008945 A | 1/2010 |
| WO | 2008/016595 A2 | 2/2008 |
| WO | 2008/060486 A2 | 5/2008 |
| WO | 2010/027509 A1 | 3/2010 |
| WO | 2013/169849 A2 | 11/2013 |
| WO | 2014/105276 A1 | 7/2014 |

OTHER PUBLICATIONS

Extended European Search Report received for European Patent Application No. 12185660.3, mailed on Oct. 15, 2013, 13 pages.
Final Office Action received for U.S. Appl. No. 13/335,836, mailed on Sep. 16, 2015, 12 pages.
Final Office Action received for U.S. Appl. No. 15/174,753 mailed on Dec. 14, 2020, 17 pages.
Final Office Action received for U.S. Appl. No. 15/174,753 mailed on Jan. 29, 2019, 16 pages.
Non-Final Office Action received for U.S. Appl. No. 13/335,836, mailed on Dec. 22, 2014, 11 pages.
Non-Final Office Action received for U.S. Appl. No. 15/174,753 mailed on Aug. 13, 2021, 20 pages.
Non-Final Office Action received for U.S. Appl. No. 15/174,753, mailed on Jun. 26, 2018, 15 pages.
Non-Final Office Action received for U.S. Appl. No. 15/174,753, mailed on May 11, 2020, 18 pages.
Notice of Allowance received for U.S. Appl. No. 13/335,836, mailed on Feb. 8, 2016, 9 pages.
Notice of Allowance received for U.S. Appl. No. 15/174,753, mailed on Apr. 7, 2022, 13 Pages.
Office Action received for Chinese Patent Application No. 201710342843.3, mailed on Oct. 9, 2019, 16 pages (9 pages of English Translation and 7 pages of Official copy).
Partial European Search Report received for European Patent Application No. 12185660.3, mailed on Apr. 15, 2013, 7 pages.
Search Report Received for Chinese Application No. 201210506244.8, mailed on Feb. 4, 2015, Sep. 28, 2012, 4 pages.
Klein et al., "Metadata Visualisation with VisMeB", Information Visualization, INFOVIS, IEEE Symposium, Piscatawav, Jul. 16, 2003, 6 pages.
Lee et al., "A Multi-Touch Three Dimensional Touch-Sensitive Tablet", CHI'85 Proceedings, Apr. 1985, pp. 21-25.

(56) References Cited

OTHER PUBLICATIONS

Liu et al., "Music Playlist Recommendation Based on User Hearbeat and Music Preference", Computer Technology and Development, ICCTD '09, International Conference On, IEEE, Piscataway, NJ, USA, Nov. 13, 2009.
Rubine, Dean, "Combining Gestures and Direct Manipulation", CHI'92, May 3-7, 1992, pp. 659-660.
Rubine, Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Torrens et al., "Visualizing and Exploring Personal Music Libraries", Proceedings of the 5th International Conference on Music Information Retrieval (ISMI R 04), Jan. 2, 2004, 8 pages.
Westerman, Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.

\* cited by examiner

PLAYLIST CONFIGURATION AND PREVIEW

CROSS-REFERENCE TO RELATED APPLICATIONS

This application is a continuation of U.S. application Ser. No. 15/174,753, filed Jun. 6, 2016 (now. U.S. Publication No. 2016-0283192), which is a continuation of U.S. application Ser. No. 13/335,836, filed Dec. 22, 2011 (now U.S. Pat. No. 9,361,942), the entire disclosures of which are incorporated herein by reference for all purposes.

TECHNICAL FIELD

The disclosure generally relates to media playback and playlist configuration.

BACKGROUND

Nearly everyone has access to digital media these days. People own digital audio devices that store digital music libraries containing thousands of music tracks. Users often listen to music streamed over the internet. Often these devices and technologies allow users to automatically generate playlists or radio stations based on a representative music track, artist, genre or other user-specified criteria. As music tracks are played from the playlist or radio station, user feedback can be received for a music track. The user can indicate whether the user likes or dislikes a music track and the user's likes or dislikes can cause an adjustment in the playlist or radio station criteria that effect which music tracks are played in the future.

SUMMARY

In some implementations, a user can play a music track from a dynamically generated playlist. The user can provide input indicating that the user likes or dislikes the music track and the playlist can be adjusted based on the user input. In some implementations, information can be presented to the user so that the user can preview changes to the playlist before the changes are made to the playlist. In some implementations, a user can adjust playlist criteria (configuration) by adjusting specific music characteristics. In some implementations, a user can adjust playlist criteria by manipulating a list of representative music tracks. In some implementations, a user can compare the user's playlist to playlists of other users.

Particular implementations provide at least the following advantages: A user can easily preview changes to a playlist and avoid changes that can negatively effect the playlist. The user is given greater control over playlist criteria and the music tracks associated with the playlist.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Dynamic Playlists

Figure 1:
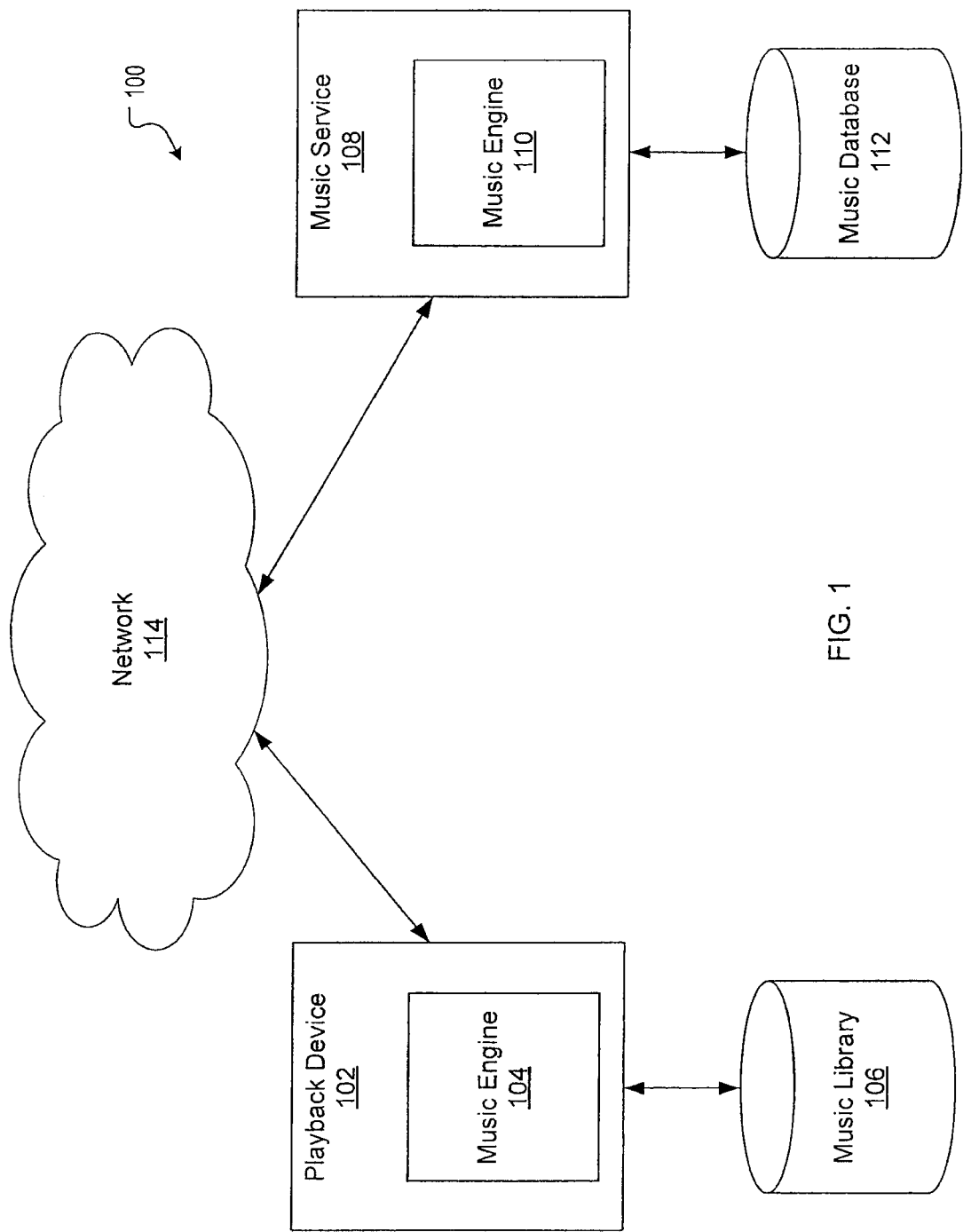
FIG. 1 illustrates a system for generating dynamic playlists.

FIG. 1 illustrates a system 100 for generating dynamic playlists. In some implementations, a user can play media associated with a playlist on a playback device 102. For example, playback device 102 can be a laptop computer, desktop computer, handheld music player, a smartphone, a tablet computer or any other device that can be configured to play back music media.

In some implementations, the playlist can be generated locally on playback device 102. For example, the playlist can be generated by music engine 104 based on music library 106 (e.g., digital music library) that is stored on or accessible to playback device 102. For example, music engine 104 can be a media application on playback device 102 that manages and plays music associated with playlists. Music library 106 can include a collection of music tracks that can be associated with a playlist and played on playback device 102.

In some implementations, the playlist can be generated at music service 108. For example, the music service 108 can be an Internet-based service and music tracks can be selected for the playlist by music engine 110 and can be streamed from music service 108 over network 114 to playback device 102. The music tracks for the playlist can be identified by music engine 110 by matching the playlist criteria to characteristics of music tracks stored in a music database 112 or music library 106. In some implementations, music database 112 can store music characteristics associated with music tracks. In some implementations, music database 112 can store playlist configuration for multiple users. For example, music database 112 can store playlist criteria for multiple playlists associated with multiple users.

In some implementations, a playlist (or radio station) can be a dynamically and/or automatically generated sequence of music tracks. The music tracks can be selected for the playlist based on user-specified criteria. In some implementations, a user can select a music track and the music track can serve as a basis for creation of the playlist. For example, the music track can have a certain set of characteristics (e.g., fast tempo, country genre, string instruments, melodic lyrics, etc.) and the characteristics of the selected music track can be the criteria by which future music tracks are selected for the playlist. The playlist can be dynamically generated. For example, the playlist does not have to be a discrete set of music tracks. Music tracks can be added and removed from the playlist in real-time based on the playlist criteria. For example, as a current music tracks is being played, the next music track (or the next five music tracks, next ten music tracks) can be selected and added to the playlist queue and automatically played when the current music track ends.

Receiving User Feedback

Figure 2:
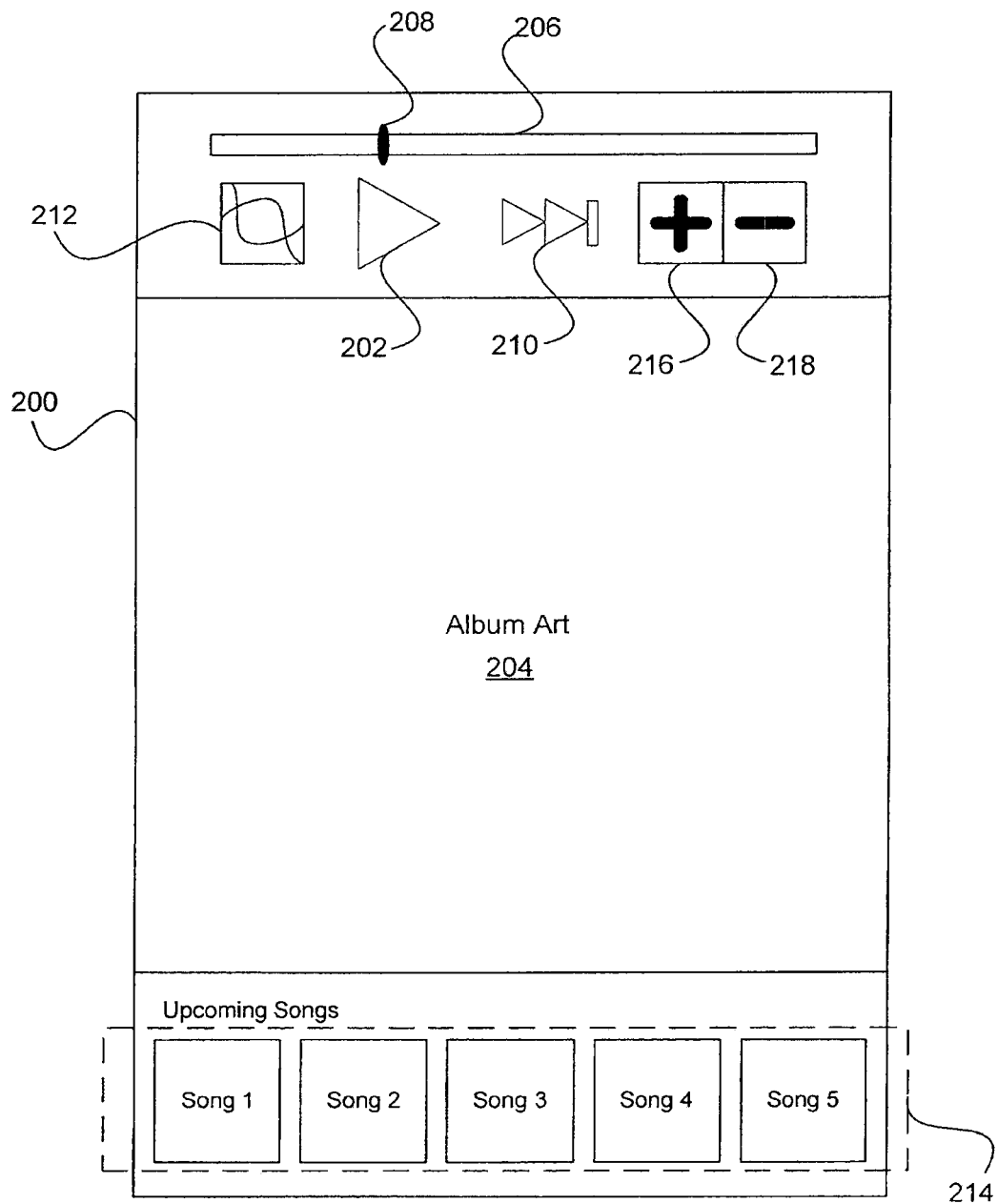
FIG. 2 illustrates an example graphical interface for playing media from a playlist.

FIG. 2 illustrates an example graphical interface 200 for playing media from a playlist. For example, graphical interface 200 can correspond to an interface of playback device 102. In some implementations, graphical interface 200 can present graphical element 202 for initiating playback of a music track from a playlist. For example, graphical element 202 can be a play button which when selected causes a music track from the playlist to be played by a playback device.

In some implementations, graphical interface can display an image 204 corresponding to the currently playing music track. For example, image 204 can be artwork corresponding to an album associated with the currently playing track. In some implementations, graphical interface 200 can include progress bar 206 and indicator 208. For example, progress bar 206 can represent how long a music track is and indicator 208 can indicate a position in the music track that corresponds to the portion of the music track that is currently being played.

In some implementations, graphical interface 200 can include graphical element 210 for skipping to the next music track in the playlist. For example, if a user wants to play the next music track in the playlist before the currently playing music track is completed, the user can select graphical element 210 to cause the next music track to be played. In some implementations, graphical interface 200 can include graphical element 212. For example, graphical element 212 can be selected to cause a playlist configuration interface to be displayed, as described further below with reference to FIG. 6.

In some implementations, graphical interface 200 can include music track list 214. For example, music track list 214 can be a list of the next five music tracks that will be played in the playlist. As each music track in music track list 214 is played, a newly selected music track can be added to the playlist. Music track list 214 can include icons for each music track in the music track list. For example, the icons can be images of album artwork associated with each music track.

In some implementations, a user can manipulate the music tracks in music track list 214. For example, the user can select a music track (e.g., icon) in music track list 214 and delete the music track from music track list 214. The user can perform a drag and drop operation on a music track in music track list 214 to rearrange the order of the upcoming music tracks in music track list 214. For example, if a user sees a music track in music track list 214 that the user really likes, the user can drag the music track to the front (e.g., left end) of music track list 214 to cause the music track to be played sooner than the other music tracks in music track list 214.

In some implementations, graphical interface 200 can include graphical elements 216 and 218 for allowing a user to provide feedback regarding the user's impression or opinion of the currently playing music track. For example, a user can select graphical element 216 to indicate that the user likes the currently playing music track. The user can select graphical element 218 to indicate that the user dislikes the currently playing music track. Selection of graphical element 216 or 218 can indicate whether the user believes the currently playing track is suitable for the playlist.

In some implementations, when a user selects graphical element 216 (e.g., like button) or graphical element 218 (e.g., dislike button) the user's selection can effect which music tracks are selected for the playlist. For example, if a user indicates that the user dislikes a music track (e.g., the user selects graphical element 218), the criteria by which music tracks are selected for the playlist will be adjusted so that music tracks having similar characteristics to the disliked music track will be less likely to be selected for playback in the future. If the user indicates that the user likes a music track (e.g., the user selects graphical element 216), the criteria by which music tracks are selected for the playlist will be adjusted so that music tracks having similar characteristics to the liked music track will be more likely to be selected for playback in the future.

In some implementations, manipulation of music track list 214 can effect which music tracks are selected for the playlist. For example, when a music track is deleted from music track list 214, the deletion can have the same effect when the user selects graphical element 218. The characteristics of the deleted music track will be considered when selecting future music tracks, for example. Music tracks having characteristics similar to the deleted music track will be less likely to be played in the future.

Confirming Changes to Playlist Criteria

Figure 3:
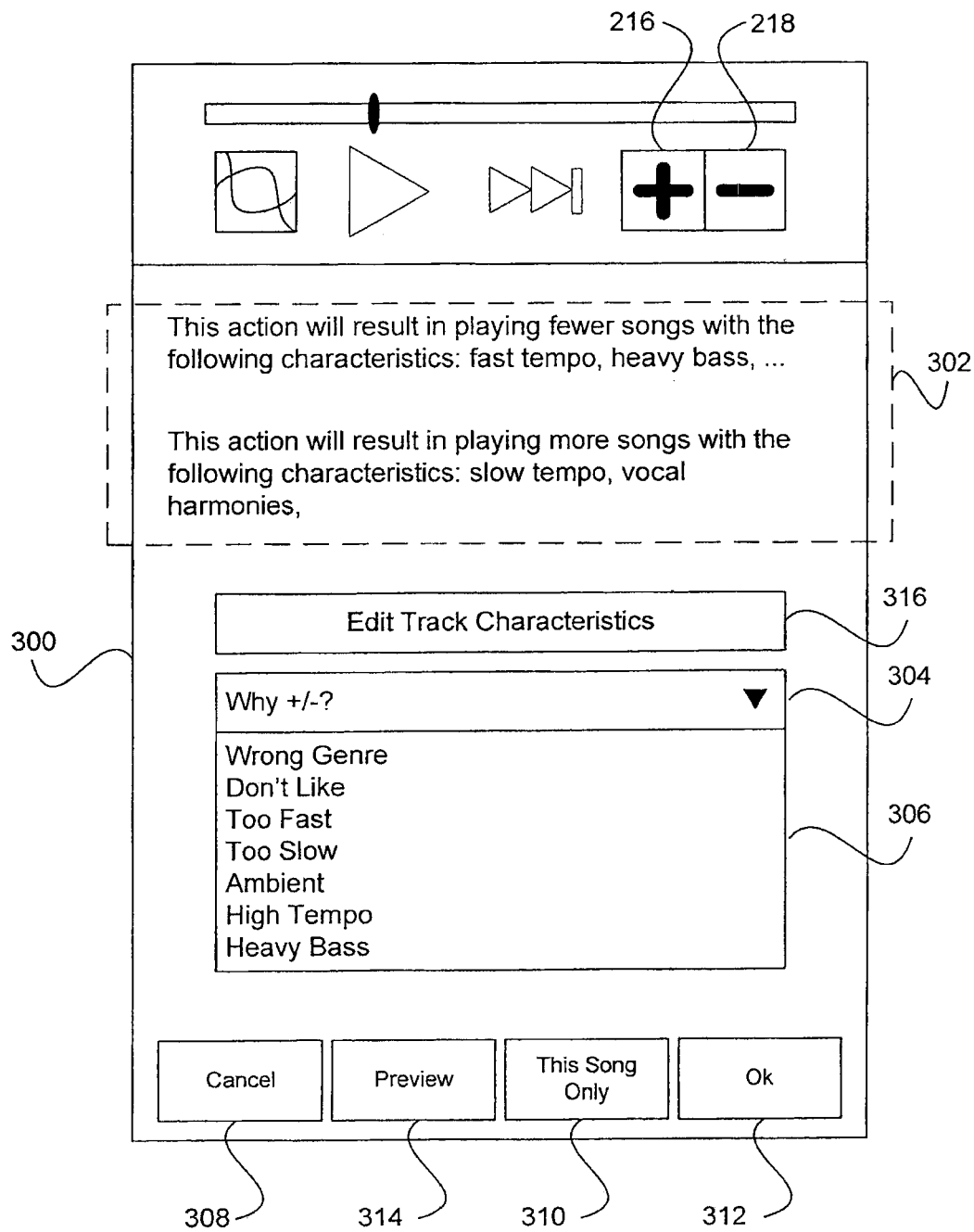
FIG. 3 illustrates an example graphical interface for confirming changes to a playlist.

FIG. 3 illustrates an example graphical interface 300 for confirming changes to a playlist. For example, graphical interface 300 can be displayed in response to the user selecting graphical element 216 or graphical element 218. Graphical interface 300 can be displayed in response to the user deleting a music track from music track list 214, for example. In some implementations, graphical interface 300 can include information area 302. For example, information area 302 can display information describing what effect the user's selection of graphical element 216 (e.g., like) or graphical element 216 (e.g., dislike) will have on the selection of future music tracks for the playlist. Information area can describe the characteristics of the liked or disliked music track and indicate that music tracks having similar characteristics are more likely or less likely to be played in the future.

In some implementations, graphical interface 300 can also include graphical element 304 for indicating a reason why the user likes or dislikes the music track. For example, graphical element 304 can be a pull-down menu including a list 306 of reasons why a user would like or dislike a music track. The user can select one of the reasons from list 306 to indicate the reason why the user likes or dislikes a music track. In some implementations, the user's reason for liking or disliking a music track can be uploaded to music service 108 and can be used to modify the classification or characteristics of the music track stored in music database 112. For example, if the user selects "wrong genre" as a reason why the user dislikes a music track, the music track can be flagged at music service 108 so that the characteristics associated with the music track (e.g., the assigned genre) can be reevaluated and adjusted in music database 112.

In some implementations, graphical interface 300 can include graphical element 308 for canceling a user's like or dislike input for a music track. For example, when a user selects graphical element 308 the user's selection of graphical element 216 or graphical element 218 will be disregarded and no adjustment to the playlist will be made. In some implementations, graphical interface 300 can include graphical element 310 for removing only the current music track from the playlist. For example, when a user selects graphical element 310, the user's input (e.g., like or dislike input) will only effect how frequently the current music track is played and the playlist criteria will not be adjusted. In some implementations, graphical interface 300 can include graphical element 312 for accepting the user's like or dislike input. For example, when a user selects graphical element 312, the changes to the playlist described in information area 302 and any other playlist input or configuration change will be applied to the playlist. In some implementations, selection of graphical element 308, 310 or 312 causes graphical interface 300 to close and graphical interface 200 to be displayed.

In some implementations, graphical interface 300 can include graphical element 314 for presenting a preview of changes to the playlist. For example, when a user selects graphical element 314 an interface can be displayed that presents a detailed preview of adjustments that will be made to the playlist if the user's like or dislike input is applied to the playlist, as described in detail with reference to FIG. 5 below. In some implementations, graphical interface 300 can include graphical element 316 for editing the characteristics of a music track.

Adjusting Track Characteristics

Figure 4:
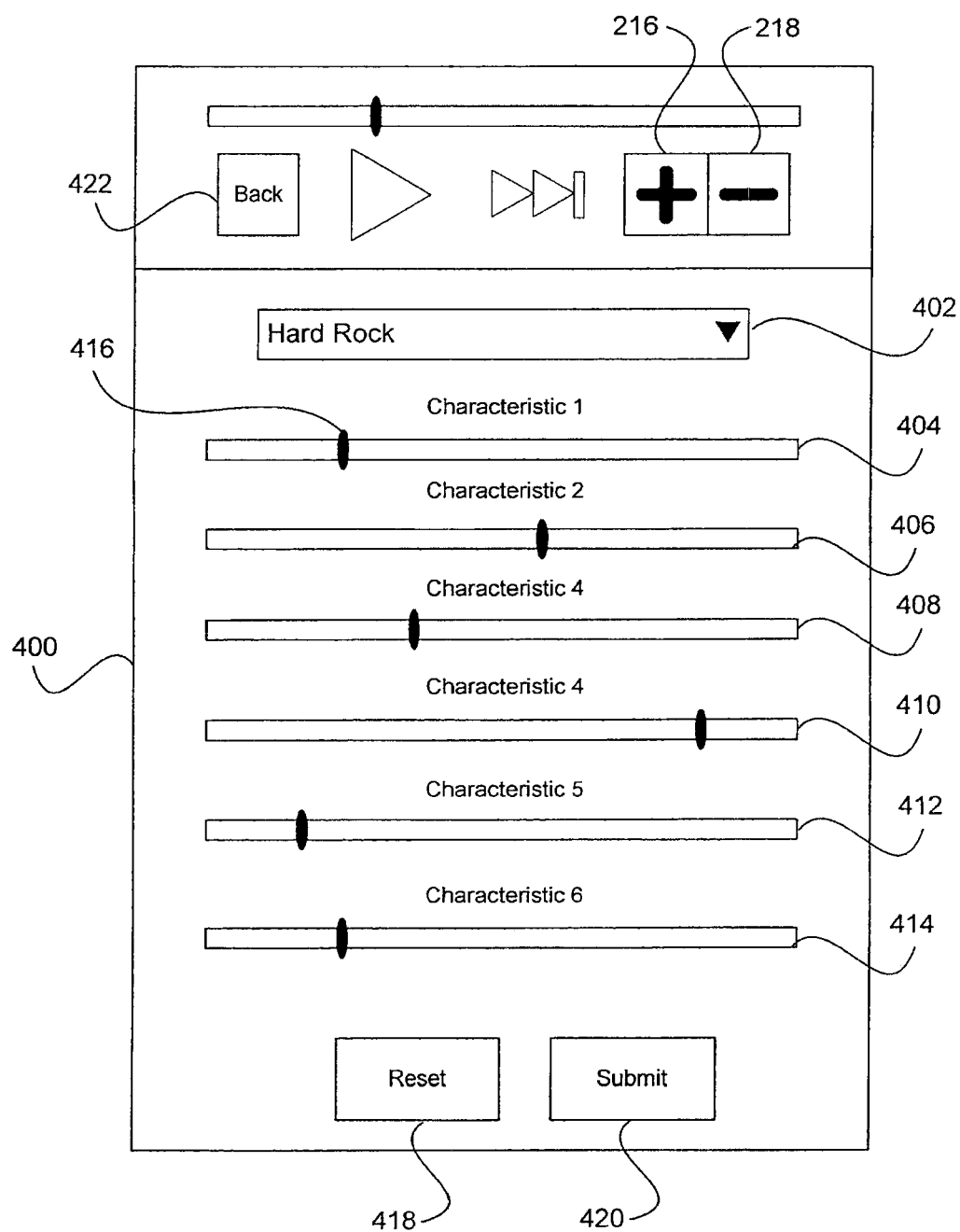
FIG. 4 illustrates an example graphical interface for editing the characteristics of a music track.

FIG. 4 illustrates an example graphical interface 400 for editing the characteristics of a music track. For example, graphical interface 400 can be displayed in response to a selection of graphical element 316 of FIG. 3. In some implementations, graphical interface 400 can include graphical elements 402-414 for presenting, editing and/or adjusting the characteristics of a music track. For example, a music track can be associated with characteristics describing the music track. Music service 108 (e.g., people working for the music service, music critics) can assign characteristics to a music track that are descriptive of the content of the music track which allow for classification and comparison of music tracks. When graphical interface 400 is invoked or initially displayed, graphical elements 402-414 can be configured to present the assigned characteristics.

In some implementations, a user can change characteristics associated with a music track by manipulating graphical elements 402-414. For example, graphical elements 402-414 can be manipulated by a user to adjust the characteristics of the music track that a user liked or disliked by selecting graphical element 216 or 218. For example, if the user believes that the music track does not belong in the user's playlist or that the characteristic values assigned to the music track are wrong, the user may wish to indicate different characteristic settings that better represent the music track.

In some implementations, a user can change the genre associated with a music track by selecting graphical element 402. For example, graphical element 402 can be a pull-down menu that lists music genres and a user can change the genre associated with the music track by selecting a new genre from the pull-down menu's list. In some implementations, the genre currently associated with the music track can be displayed at the top of the pull-down menu's list. The genre currently associated with the music track can be displayed when the pull-down list is not displayed.

In some implementations, a user can change characteristics of a music track by adjusting graphical elements 404-414. For example, graphical elements 404-414 can correspond to music characteristics such as pitch, rhythm, dynamics, timbre and texture. Graphical element 404 can correspond to tempo (e.g., speed or pace of the track), for example. If the user believes that the tempo value currently assigned to the music track is not accurate, the user can adjust graphical element 404 to represent the user's opinion of the track's tempo. For example, graphical element 404 can be a slider element where the left end of the slider corresponds to a slow tempo and the right end of the slider corresponds to a fast tempo. The user can slide position indicator 416 left or right along the slider to adjust the tempo assigned to the music track. The adjustment of graphical element 404 does not change the content of the music track, the adjustment merely changes the descriptive characteristics assigned to the music track. Other music characteristics can be adjusted by manipulating graphical elements 404-414. For example, characteristics associated with the feelings invoked in the user by a music track can be represented and adjusted by graphical elements 404-424. These characteristics can correspond to a mood invoked in the listener (dark, light, joy, sadness, etc.), for example.

In some implementations, graphical interface 400 can include a graphical element 420 for submitting the characteristics edits to music service 108. For example, once the user has made the adjustments to the assigned characteristics of the music track, the user can submit the adjustments to the music service for consideration. For example, the music service can manage metadata (including music track characteristics) associated with music tracks in music database 112 and update playback device 102 with the music track metadata when the music track metadata changes. Music service 108 can adjust the characteristics of the music track based on the user's input to graphical interface 400, for example. Music service 108 can transmit the adjusted characteristics to the user's playback device to update music library 106 so that music engine 104 an identify music tracks for playlists based on the updated metadata, for example. If music service 108 is configured to stream playlist music tracks to playback device 102, music service 108 can use the adjusted music track characteristics in music database 112 to determine which playlists should include the music track. For example, music engine 104 and/or music engine 110 can match playlist criteria to music track characteristics to determine a match between music tracks and playlists.

In some implementations, graphical interface 400 can include graphical element 418 for resetting the characteristics of a music track. For example, if the user has made adjustments to the track's characteristics on graphical interface 400, the user can reset the music track's characteristics back to their previous values (e.g., reset to the characteristics defined by music service 108) by selecting graphical element 418. In some implementations, the user can select graphical element 422 to return to graphical interface 300.

Playlist Adjustment Preview

Figure 5:
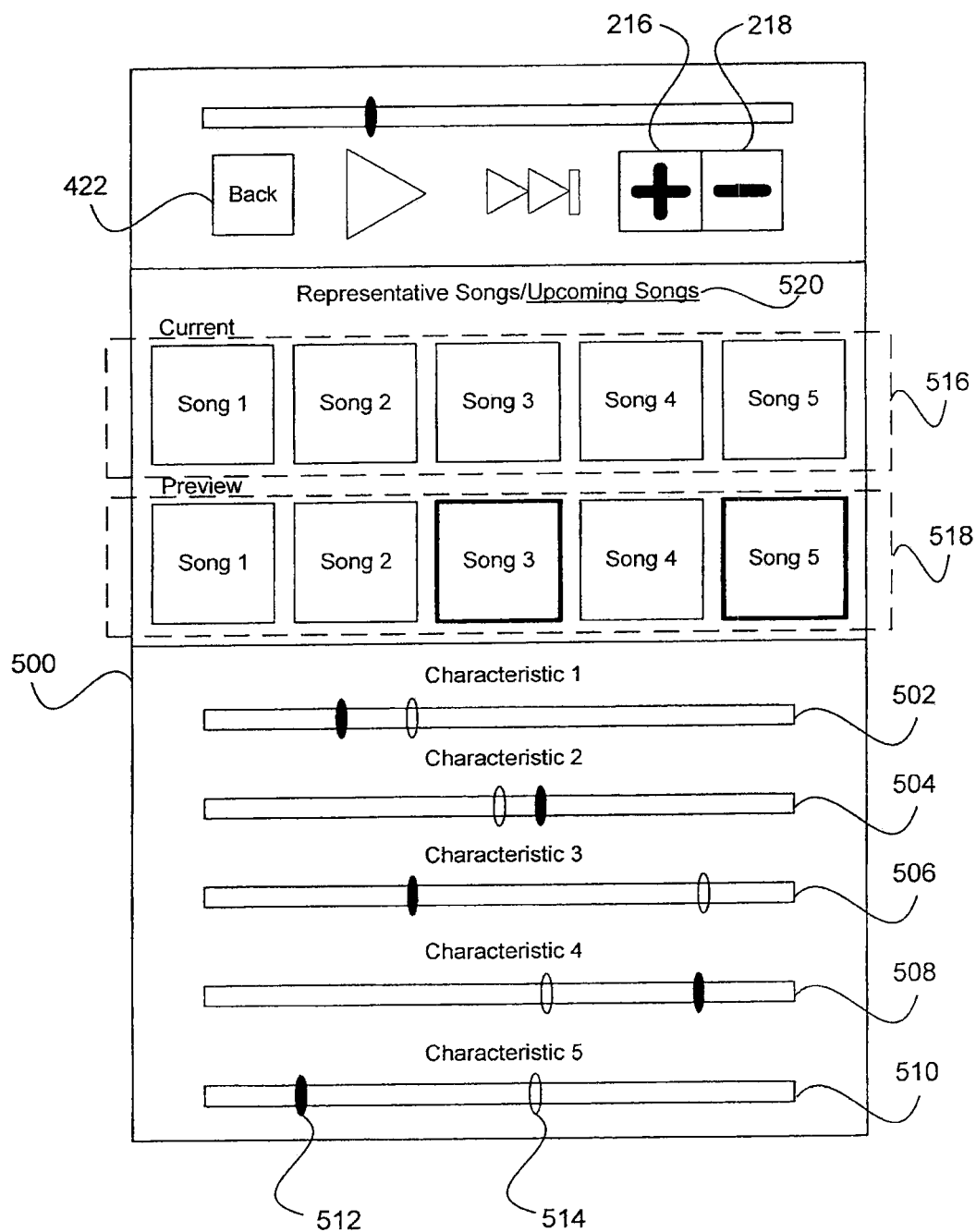
FIG. 5 illustrates an example graphical interface for presenting a preview of changes to a playlist.

FIG. 5 illustrates an example graphical interface 500 for presenting a preview of changes to a playlist. For example, graphical interface 500 can be presented in response to a user selecting graphical element 314 of FIG. 3. Graphical interface 500 can present a preview of changes to a playlist that will result from a user expressing or indicating a liking (e.g., selecting graphical element 216) or disliking (e.g., selecting graphical element 218) for a music track, for example.

In some implementations, graphical interface 500 can present a preview of changes to playlist criteria. For example, playlist criteria can include music characteristics such as the characteristics associated with music tracks described above. The playlist criteria (characteristics) can be presented as a value within a range of values and represented by graphical elements 502-510, for example. Graphical element 510 can represent a range in tempo, for example. In some implementations, graphical elements 502-510 can indicate current values and provide a preview of future values for the playlist criteria. For example, current position indicator 512 can indicate the current value for the tempo characteristic of the playlist criteria. Preview indicator 514 can indicate the future value for the tempo characteristic of the playlist criteria. For example, preview indicator 514 can indicate what the value of the tempo characteristic will be if the user's like or dislike indication is applied to the playlist. Thus, the user can quickly identify how the user's feedback will effect the playlist criteria.

In some implementations, graphical interface 500 can present a preview of changes to music track selection resulting from a user indicating a like or dislike of a music track. For example, graphical interface 500 can display a list 516 of music tracks representing the current playlist criteria. In some implementations, list 516 can include icons or images associated with each music track. For example, the icons or images can correspond to album artwork associated with each music track. The music tracks in list 516 can be the five music tracks that best represent the current playlist criteria, for example. In some implementations, list 516 can present a list of the next songs to be played in the playlist. For example, list 516 can present the next five songs that will be played. In this implementation, list 516 can correspond to music track list 214.

In some implementations, graphical interface 500 can display a list 518 of music tracks representing future playlist criteria. For example, list 518 can present a list of music tracks representing changes in the playlist criteria that will result from the user liking or disliking a music track. In some implementations, list 518 can include icons or images associated with each future music track. For example, the icons or images can correspond to album artwork associated with each future music track. The music tracks in list 518 can be the five music tracks that best represent the future playlist criteria, for example. In some implementations, list 518 can present a list of the next songs that will be played if the playlist criteria are changed. For example, list 518 can present the next five songs that will be played based on the changed criteria.

In some implementations, a user can change between listing representative music tracks and listing upcoming music tracks in lists 516 and 518. For example, graphical element 520 can be selectable to toggle between representative music track lists and upcoming music track lists. In some implementations, the underlined text of graphical element 520 can be selected to switch to the upcoming music track lists, for example. When the upcoming music tracks lists are displayed in lists 516 and 518, the text of graphical element 520 corresponding to the representative lists can be underlined and the user can select the underlined text to display the representative music tracks lists.

In some implementations, a user can visually compare list 516 and list 518 to determine how changes to the playlist criteria will change which songs will be selected for the playlist. For example, by examining and comparing list 516 and list 518 the user can quickly identify that song 3 and song 5 in the preview list are different than song 3 and song 5 in the current list of tracks. This visual comparison can give the user a better idea of how music track selection will change in response to the change in playlist criteria. The user can select graphical element 422 to return to graphical interface 300 of FIG. 3.

Playlist Configuration

Figure 6:
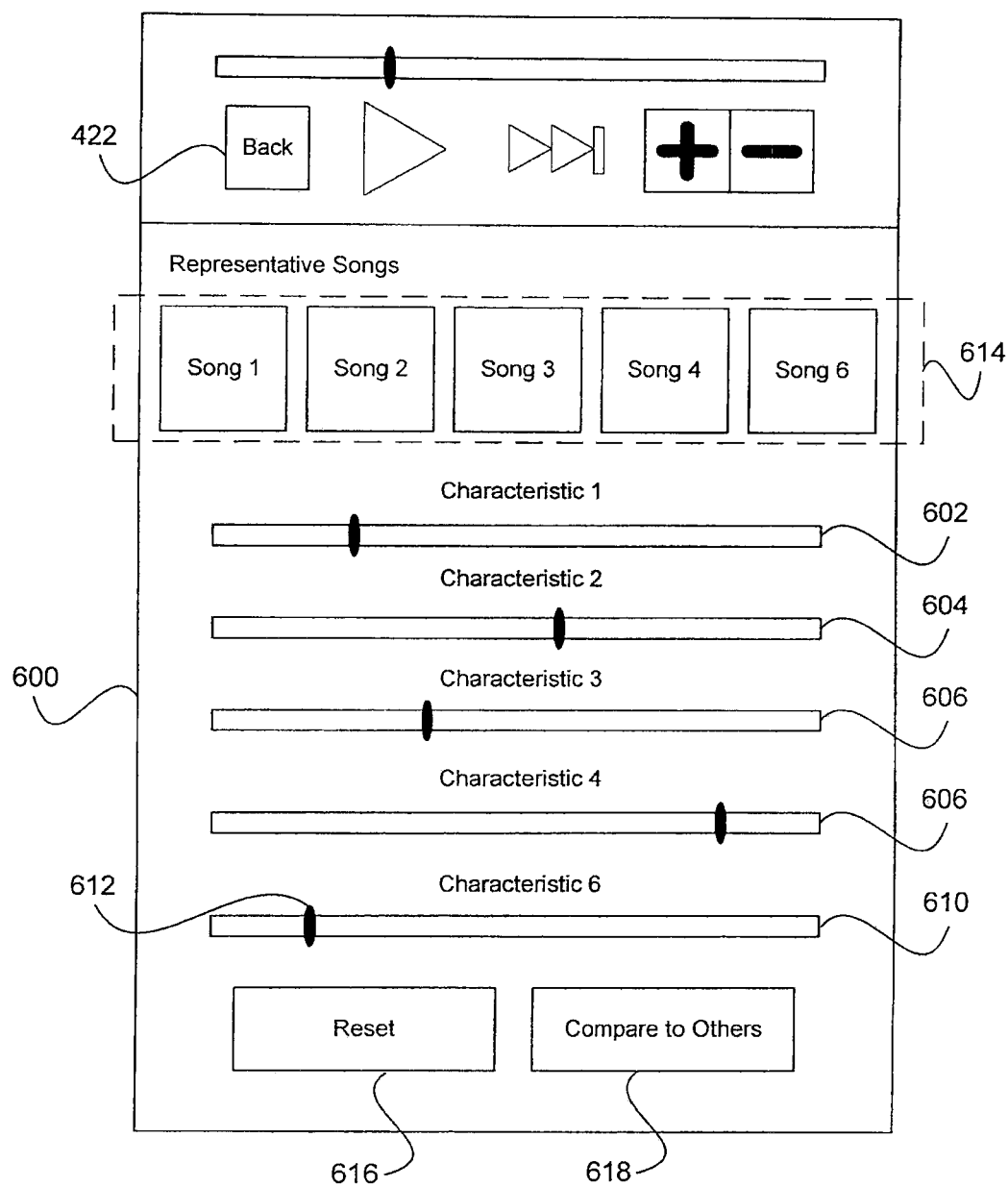
FIG. 6 illustrates an example graphical interface for viewing and manipulating playlist criteria.

FIG. 6 illustrates an example graphical interface 600 for viewing and manipulating playlist criteria. For example, graphical interface 600 can be displayed in response to a user selecting graphical element 212 of FIG. 2. In some implementations, graphical interface 600 can include graphical elements 602-610 for displaying and manipulating playlist criteria. For example, graphical elements 602-610 can correspond to characteristics of music that define the playlist and can include the music track characteristics described above. In some implementations, graphical elements 602-610 can be slider bars that can be manipulated by a user to adjust the value of playlist criteria or characteristics. For example, if graphical element 610 corresponds to a range of tempo values, the user can select and drag position indicator 612 to different positions along the slider bar of graphical element 610 to set a new tempo value for the playlist. This change in tempo value can result in selecting music tracks for the playlist in the future that have faster or slower tempos, for example.

In some implementations, graphical interface 600 can include a representative music track list 614. For example, list 614 can correspond to list 516 of FIG. 5. Representative music track list can display images or icons associated with the tracks in the list. In some implementations, list 614 can present a list of music tracks that best represent the playlist criteria. In some implementations, list 614 can be updated in real-time as changes are made to the playlist criteria. For example, as adjustments are made to graphical elements 602-610, list 614 can be updated to represent the music tracks that best represent the adjusted criteria.

In some implementations, representative music track list 614 is adjustable to change playlist criteria. For example, a user can rearrange the music tracks in list 614 to emphasize features of certain music tracks. For example, if a user moves a music track from position five to position one in list 614, the playlist criteria can be adjusted to give more weight to the characteristics of the moved music track. In some implementations, a user can replace a music track in list 614 to cause a corresponding adjustment in the playlist criteria. For example, a user can select an image list 614 to invoke an interface (not shown) for selecting a different music track. Once a different music track is selected, the music track can replace the music track that was selected for replacement. In some implementations, the characteristics of the replacement music track can be incorporated into the playlist criteria. In some implementations, as music tracks in list 614 are manipulated, moved or replaced, graphical elements 602-610 can be adjusted to reflect the changes in the playlist criteria that resulted from the manipulation of list 614.

In some implementations, the characteristics of representative music tracks can be averaged to determine the playlist criteria values. For example, as a user replaces music tracks in representative music tracks list 614, the values of characteristics associated with the added music track can be averaged with the existing music tracks in list 614 to determine the values of corresponding playlist criteria. For example, if representative list 614 includes music tracks with tempo values 5, 8, 6, 9 and 7 on a scale of one to ten (1-10 scale), then the value of the playlist criteria corresponding to tempo can be set to seven. In some implementations, the most frequent value will be used to determine a value for playlist criteria. For example, the music tracks in representative list can be associated with different genres. Genres values cannot be averaged, thus the genre that appears most frequently in the representative list can be used as the genre in the playlist criteria.

In some implementations, a user can select graphical element 616 to reset the playlist criteria to their former values. For example, if a user has adjusted the playlist criteria values by manipulating graphical elements 602-610 or by manipulating representative music track list 614, then the playlist criteria can be reset to their previous values (e.g., the values to which they were set when graphical interface 600 was invoked) by selecting graphical element 616. In some implementations, changes to the playlist criteria can be saved when the user selects graphical element 422. For example, the changes to the playlist criteria can be saved to playback device 102 and/or uploaded to music service 108. In some implementations, graphical interface 600 can be closed and graphical interface 200 can be displayed in response to a user selecting graphical element 422. In some implementations, a user can compare the user's playlist to the playlists of other users by selecting graphical element 618.

Comparing Users' Playlists

Figure 7:
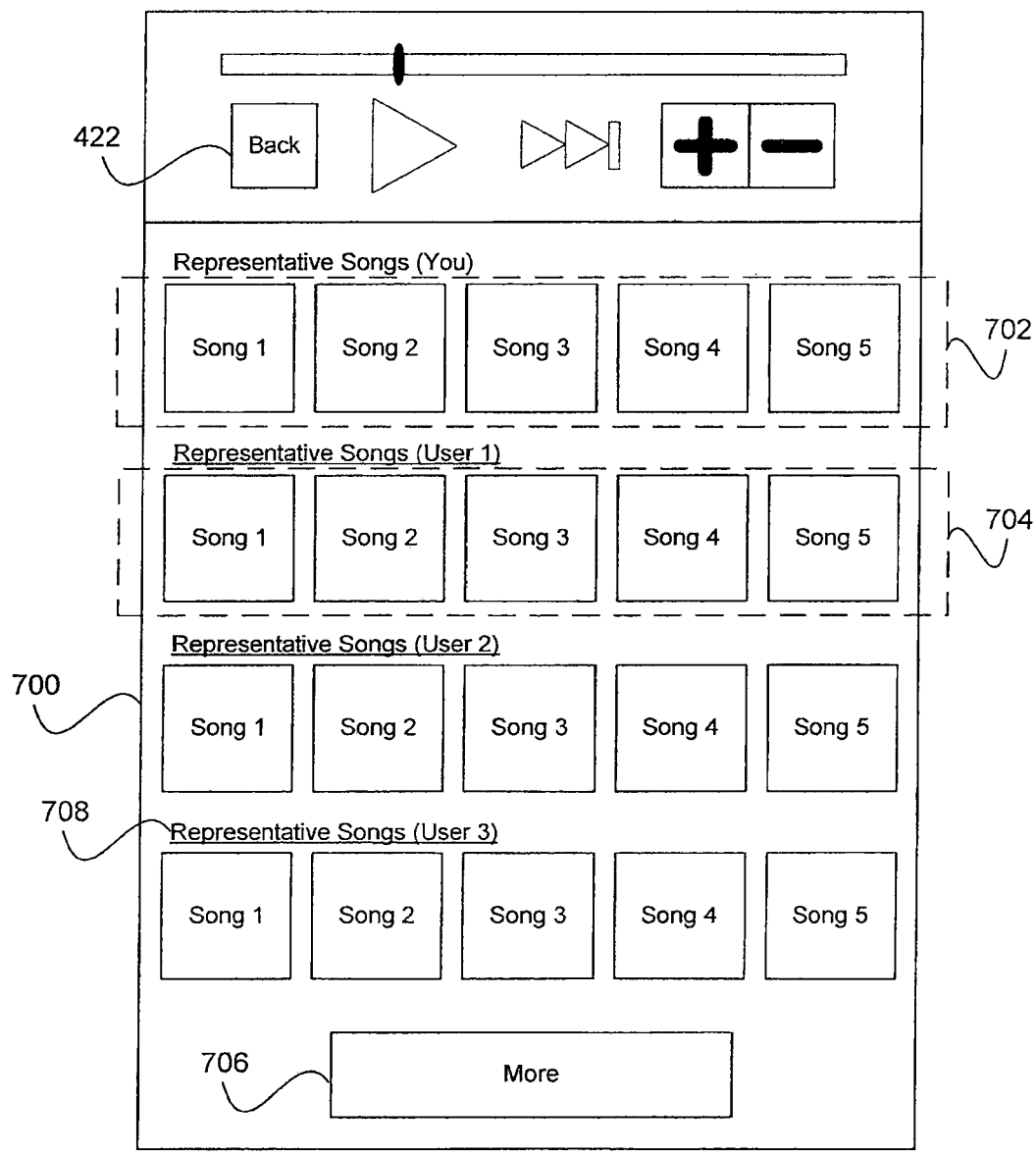
FIG. 7 illustrates an example graphical interface for comparing users' playlists.

FIG. 7 illustrates an example graphical interface 700 for comparing users' playlists. For example, graphical interface 700 can allow a user to compare the user's playlist criteria to the playlist criteria of other users. For example, music service 108 can manage users' playlists. As a user updates or modifies playlist criteria, the playlist criteria can be uploaded to music service 108. Thus, the media service can manage playlist criteria for many users.

In some implementations, when graphical interface 700 is invoked on playback device 102, a request for other users' playlists can be transmitted to music service 108. For example, the request can include playlist criteria and/or representative music tracks of the user's playlist. The request can include the song, artist, genre or other criteria upon which the playlist is based. The music service can determine similar playlists from among the playlists associated with other users. For example, the playlist criteria and/or representative songs can be compared to the playlist criteria and/or representative songs of other users' playlists to determine similarities between the playlists.

In some implementations, only the playlists that have different playlist criteria or representative music tracks will be displayed in graphical interface 700. For example, graphical interface 700 can present music tracks that are representative of different playlists so that a user can compare the representative tracks of the user's playlist to the representative tracks of other users' playlists. By comparing the representative tracks of other playlists, the user can identify ways to adjust the user's playlist criteria to produce a better playlist. For example, the user can incorporate representative songs from other users' playlists into the user's playlist to make a better playlist.

In some implementations, graphical interface 700 can include representative track list 702. Track list 702 can include music tracks that represent the playlist criteria of the user, for example. Graphical interface 700 can include representative track list 704. For example, track list 704 can include music tracks that represent the playlist criteria of another user (e.g., user 1). Graphical interface 700 can include graphical element 706 to display more playlist information for other users. For example, if graphical interface 700 displays playlist information for other users 1-3, then selection of graphical element 706 will result in playlist information for other users 4-6 to be displayed.

In some implementations, a user can select graphical element 708 to view detailed playlist comparison information. For example, a user can select the text of graphical element 708 (e.g., corresponding to user 3) to display an interface for comparing the details of user three's playlist and the details of the user's playlist. In some implementations, a user can select graphical element 422 to cause graphical interface 600 to be displayed.

Detailed Playlist Comparison

Figure 8:
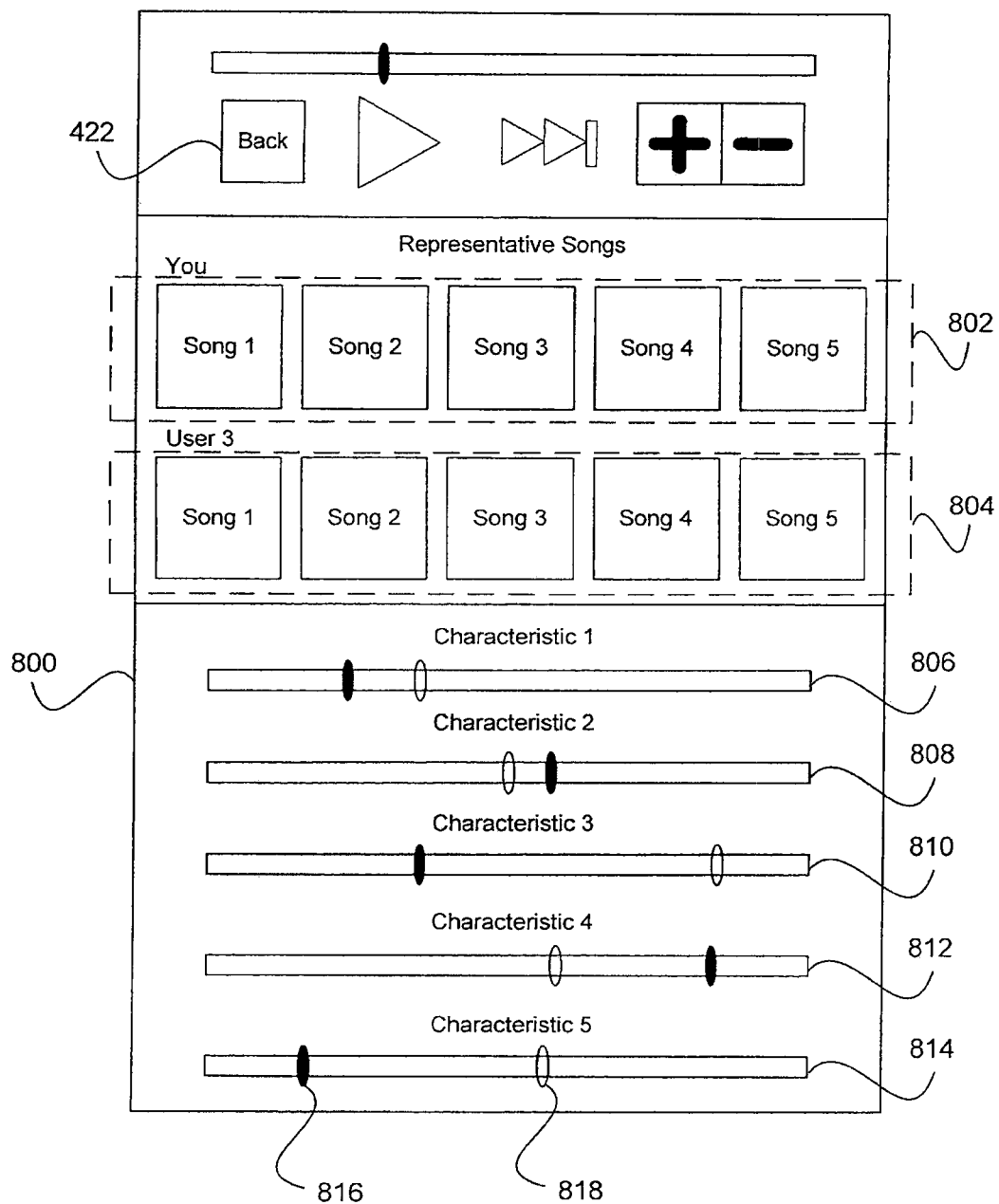
FIG. 8 illustrates an example graphical interface for presenting detailed playlist comparison information.

FIG. 8 illustrates an example graphical interface 800 for presenting detailed playlist comparison information. In some implementations, graphical interface 800 can display a list 802 of music tracks representative of the user's playlist and a list 804 representative of another user's playlist. Displaying list 802 and list 804 can allow a user to easily make a visual comparison of playlist criteria. In some implementations, a user can adjust the playlist criteria for the user's playlist by manipulating list 802 and 804. For example, if the user sees a music track in list 804 that the user likes, the user can select and drag the music track from list 804 into list 802. The user can select and drag the track into a position in list 802 and the list can automatically adjust to make room for the selected track. For example, the last music track in list 802 can be removed to make room for the selected music track from list 804. In some implementations, the characteristics of the added music track can be incorporated into the playlist criteria. For example, the playlist criteria can be adjusted to account for the added music track and account for the removed music track.

In some implementations, graphical elements 806-814 can display playlist criteria values associated with the playlists displayed on graphical interface 800. For example, graphical elements 806-814 can correspond to playlist criteria (e.g., music characteristics), as described above. For example, graphical element 814 can correspond to a range of tempo values. Position indicator 816 can correspond to the tempo value for the user's playlist (e.g., a tempo value of three). Position indicator 818 can correspond to the tempo value for the other user's playlist (e.g., a tempo value of six). Thus, a user can quickly compare the user's playlist criteria to the playlist criteria of other user's.

In some implementations, a user can adjust graphical elements 806-814 to cause a corresponding adjustment in playlist criteria. For example, a user can move position indicator 816 along the slider bar of graphical element 814 to adjust the playlist criteria value for tempo. The user can make the tempo adjustment to change to tempo value of the user's playlist to be closer to the tempo value of the comparison playlist (e.g., the other user's playlist). In some implementations, the user can select graphical element 422 to exit graphical interface 800 and cause graphical interface 600 to be displayed.

Additional Representations of Music Characteristics

In some implementations, the music characteristics and/or playlist criteria can be represented and adjusted using a variety of graphical interface elements. For example, the music characteristics and playlist criteria values represented by graphical elements 304-314, 402-410, 602-610 and/or 806-814 can be presented using color, shapes, sizes, volumes and/or other graphical elements.

In some implementations, a graphical interface can be displayed where each music characteristic or playlist criteria is represented by a different color. For example, tempo can be represented by the color red. In some implementations, the value for the music characteristic or playlist criteria can be represented by the volume, area, amount or intensity of the color displayed. For example, a large area of red color displayed on the graphical interface can represent a fast tempo. A small area of red color can represent a slow tempo. In some implementations, the user can draw areas of color to change music characteristics associated with a track or playlist criteria. Thus, a graphical interface having color representations of music characteristics or playlist criteria can present many different colors representing the various music characteristics and/or playlist criteria.

In some implementations, the colors can be colors that fill geometric shapes on the graphical interface and the sizes of the geometric shapes can represent a value of the corresponding music characteristic and/or playlist criteria. For example, the user can change the sizes and dimensions of the geometric shapes to cause a corresponding change in the music characteristic or playlist criteria.

In some implementations, music characteristics and playlist criteria values can be represented on a two dimensional grid. For example, a two dimensional grid can be displayed where one dimension represents tempo and the other dimension represents timbre. The two dimensional grid can include a position indicator that can be moved by the user within the two dimensional grid to specify the values for tempo and timbre.

Example Processes

Figure 9:
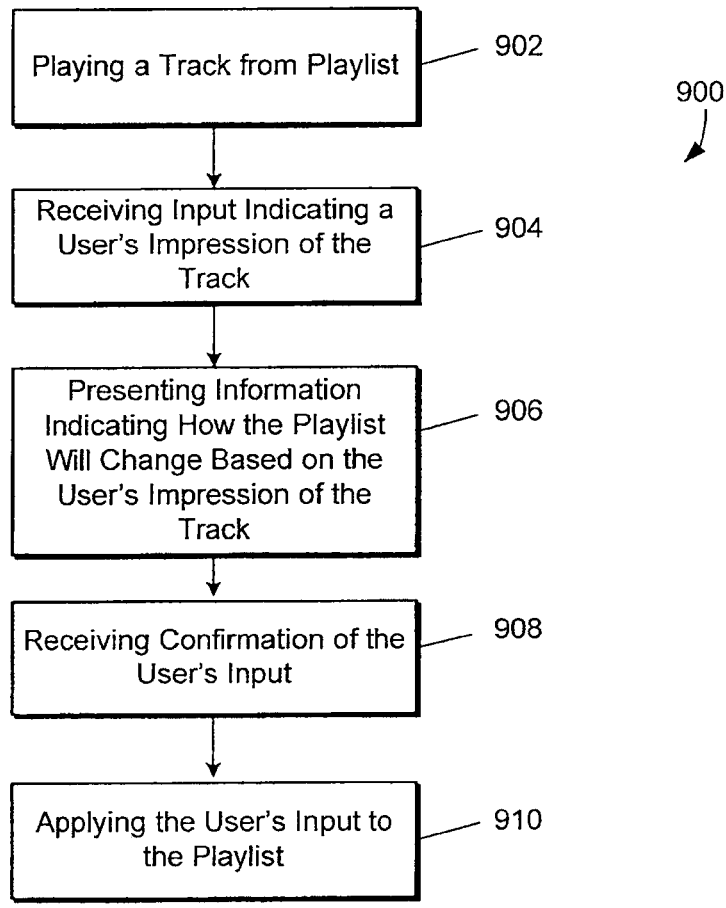
FIG. 9 is a flow diagram of an example process for presenting feedback regarding a user initiated playlist criteria change.

FIG. 9 is a flow diagram of an example process 900 for presenting feedback regarding a user initiated playlist criteria change. At step 902, a music track associated with a playlist can be played on a playback device. For example, the music track can be played on playback device 102 of FIG. 1.

At step 904, input indicating a user's impression or opinion of the playing music track can be received. For example, a user can indicate whether the user likes or dislikes the currently playing music track, as described with reference to FIG. 2.

At step 906, information indicating how the playlist criteria will change based on the users input can be presented. For example, information describing the music track characteristics and how those characteristics will change the playlist criteria can be displayed, as described with reference to FIG. 3.

At step 908, confirmation of the user's input can be received. For example, once the user reviews or previews the changes to the playlist criteria, the user can confirm the playlist criteria changes, as described with reference to FIGS. 3-5.

At step 910, the user's input can be applied to change the playlist criteria. For example, the playlist criteria can be adjusted based on the characteristics of the music track that the user likes or dislikes, as described above.

Figure 10:
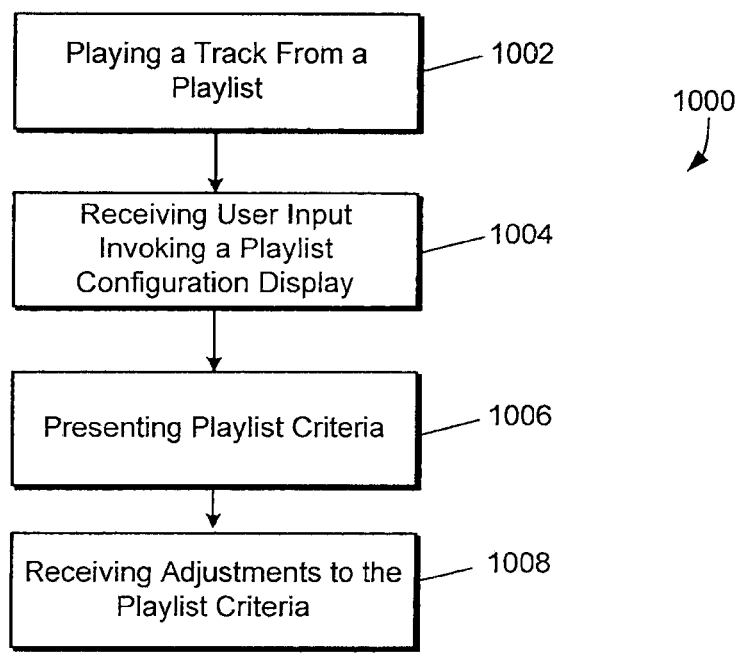
FIG. 10 is a flow diagram of an example process for configuring playlist criteria.

FIG. 10 is a flow diagram of an example process 1000 for configuring playlist criteria. At step 1002, a music track associated with a playlist can be played on a playback device. For example, the music track can be played on playback device 100 of FIG. 1.

At step 1004, user input can be received that invokes a playlist configuration display. For example, the playlist configuration display can be invoked from graphical interface 200 of FIG. 2.

At step 1006, playlist criteria can be presented. For example, playlist criteria can be presented on device 102 of FIG. 1. Playlist criteria can be presented to the user using the graphical interfaces described with reference to FIGS. 5-8, for example.

At step 1008, adjustments to the playlist criteria can be received. For example, playlist criteria can be adjusted by the user using the graphical interfaces described with reference to FIGS. 5-8.

Example System Architecture

Figure 11:
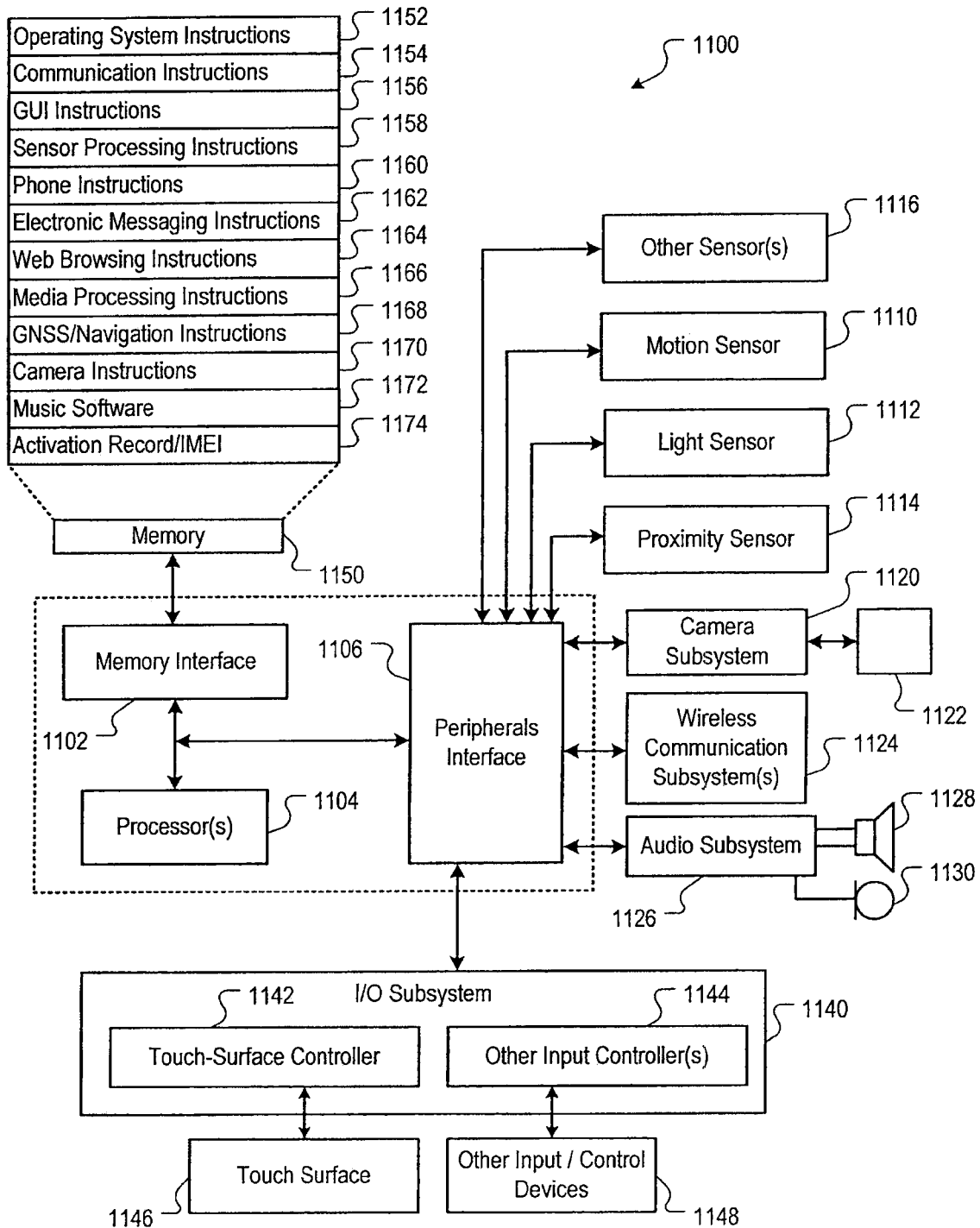
FIG. 11 is a block diagram of an exemplary system architecture implementing the features and processes of FIGS. 1-10.

FIG. 11 is a block diagram of an example computing device 1100 that can implement the features and processes of FIGS. 1-10. For example, computing device 1100 can correspond to playback device 100 of FIG. 1. The computing device 1100 can include a memory interface 1102, one or more data processors, image processors and/or central processing units 1104, and a peripherals interface 1106. The memory interface 1102, the one or more processors 1104 and/or the peripherals interface 1106 can be separate components or can be integrated in one or more integrated circuits. The various components in the computing device 1100 can be coupled by one or more communication buses or signal lines.

Sensors, devices, and subsystems can be coupled to the peripherals interface 1106 to facilitate multiple functionalities. For example, a motion sensor 1110, a light sensor 1112, and a proximity sensor 1114 can be coupled to the peripherals interface 1106 to facilitate orientation, lighting, and proximity functions. Other sensors 1116 can also be connected to the peripherals interface 1106, such as a global navigation satellite system (GNSS) (e.g., GPS receiver), a temperature sensor, a biometric sensor, or other sensing device, to facilitate related functionalities.

A camera subsystem 1120 and an optical sensor 1122, e.g., a charged coupled device (CCD) or a complementary metal-oxide semiconductor (CMOS) optical sensor, can be utilized to facilitate camera functions, such as recording photographs and video clips. The camera subsystem 1120 and the optical sensor 1122 can be used to collect images of a user to be used during authentication of a user, e.g., by performing facial recognition analysis.

Communication functions can be facilitated through one or more wireless communication subsystems 1124, which can include radio frequency receivers and transmitters and/or optical (e.g., infrared) receivers and transmitters. The specific design and implementation of the communication subsystem 1124 can depend on the communication network (s) over which the computing device 1100 is intended to operate. For example, the computing device 1100 can include communication subsystems 1124 designed to operate over a GSM network, a GPRS network, an EDGE network, a Wi-Fi or WiMax network, and a Bluetooth™ network. In particular, the wireless communication subsystems 1124 can include hosting protocols such that the device 102 can be configured as a base station for other wireless devices.

An audio subsystem 1126 can be coupled to a speaker 1128 and a microphone 1130 to facilitate voice-enabled functions, such as speaker recognition, voice replication, digital recording, and telephony functions. The audio subsystem 1126 can be configured to facilitate playback of audio tracks associated with playlists, as described above with reference to FIGS. 1-10.

The I/O subsystem 1140 can include a touch-surface controller 1142 and/or other input controller(s) 1144. The touch-surface controller 1142 can be coupled to a touch surface 1146. The touch surface 1146 and touch-surface controller 1142 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 1146.

The other input controller(s) 1144 can be coupled to other input/control devices 1148, such as one or more buttons, rocker switches, thumb-wheel, infrared port, USB port, and/or a pointer device such as a stylus. The one or more buttons (not shown) can include an up/down button for volume control of the speaker 1128 and/or the microphone 1130.

In one implementation, a pressing of the button for a first duration can disengage a lock of the touch surface 1146; and a pressing of the button for a second duration that is longer than the first duration can turn power to the computing device 1100 on or off. Pressing the button for a third duration can activate a voice control, or voice command, module that enables the user to speak commands into the microphone 1130 to cause the device to execute the spoken command. The user can customize a functionality of one or more of the buttons. The touch surface 1146 can, for example, also be used to implement virtual or soft buttons and/or a keyboard.

In some implementations, the computing device 1100 can present recorded audio and/or video files, such as MP3, AAC, and MPEG files. In some implementations, the computing device 1100 can include the functionality of an MP3 player, such as an iPod™. The computing device 1100 can, therefore, include a 36-pin connector that is compatible with the iPod. Other input/output and control devices can also be used.

The memory interface 1102 can be coupled to memory 1150. The memory 1150 can include high-speed random access memory and/or non-volatile memory, such as one or more magnetic disk storage devices, one or more optical storage devices, and/or flash memory (e.g., NAND, NOR). The memory 1150 can store an operating system 1152, such as Darwin, RTXC, LINUX, UNIX, OS X, WINDOWS, or an embedded operating system such as VxWorks.

The operating system 1152 can include instructions for handling basic system services and for performing hardware dependent tasks. In some implementations, the operating system 1152 can be a kernel (e.g., UNIX kernel). In some implementations, the operating system 1152 can include instructions for performing playlist configuration and preview functions. For example, operating system 1152 can implement the playlist configuration and preview features as described with reference to FIGS. 1-10.

The memory 1150 can also store communication instructions 1154 to facilitate communicating with one or more additional devices, one or more computers and/or one or more servers. The memory 1150 can include graphical user interface instructions 1156 to facilitate graphic user interface processing; sensor processing instructions 1158 to facilitate sensor-related processing and functions; phone instructions 1160 to facilitate phone-related processes and functions; electronic messaging instructions 1162 to facilitate electronic-messaging related processes and functions; web browsing instructions 1164 to facilitate web browsing-related processes and functions; media processing instructions 1166 to facilitate media processing-related processes and functions; GNSS/Navigation instructions 1168 to facilitate GNSS and navigation-related processes and instructions; and/or camera instructions 1170 to facilitate camera-related processes and functions.

The memory 1150 can store music software instructions 1172 to facilitate other processes and functions, such as the playlist configuration and preview processes and functions as described with reference to FIGS. 1-10. For example, the software instructions can correspond to features of playback device 102, music service 108 and/or music engine 104 or 110.

The memory 1150 can also store other software instructions (not shown), such as web video instructions to facilitate web video-related processes and functions; and/or web shopping instructions to facilitate web shopping-related processes and functions. In some implementations, the media processing instructions 1166 are divided into audio processing instructions and video processing instructions to facilitate audio processing-related processes and functions and video processing-related processes and functions, respectively. An activation record and International Mobile Equipment Identity (IMEI) 1174 or similar hardware identifier can also be stored in memory 1150.

Each of the above identified instructions and applications can correspond to a set of instructions for performing one or more functions described above. These instructions need not be implemented as separate software programs, procedures, or modules. The memory 1150 can include additional instructions or fewer instructions. Furthermore, various functions of the computing device 1100 can be implemented in hardware and/or in software, including in one or more signal processing and/or application specific integrated circuits.

What is claimed is:

1. A method comprising:
   at an electronic device in communication with a display and a touch-sensitive surface:
   displaying, via the display, a first playlist user interface having at least one representation of a generated playlist associated with a user, with tracks for the generated playlist being selected based on one or more playlist criteria specified by the user;
   while displaying the first playlist user interface, receiving a touch input on the touch-sensitive surface; and
   in response to receiving the touch input, displaying, via the display, a second playlist user interface, comprising concurrently displaying in the second playlist user interface:
      a plurality of visual representations of a first set of a plurality of tracks associated with the generated playlist associated with the user;
      a plurality of visual representations of a second set of a plurality of tracks associated with an other playlist associated with an other user; and
      a plurality of visual representations of one or more playlist criteria, including:
         a first visual representation indicating a value of a first playlist criterion from the one or more playlist criteria specified by the user, wherein the value of the first playlist criterion corresponds to a first measure of a musical characteristic associated with one or more tracks from the first set of the plurality of tracks; and
         a second visual representation indicating a value of a second playlist criterion from one or more playlist criteria specified by the other user, wherein the value of the second playlist criterion corresponds to a second measure of the musical characteristic associated with one or more tracks from the second set of the plurality of tracks, and the second set of the plurality of tracks are selected based on the one or more playlist criteria specified by the other user.

2. The method of claim 1, wherein the user comprises a first user, the generated playlist associated with the user comprises a first generated playlist, wherein the other user comprises a second user, the other playlist associated with the other user comprises a second generated playlist, and wherein the second playlist user interface comprises:
   a plurality of visual representations of a third set of a plurality of tracks associated with a third playlist associated with a different user than the user and the other user.

3. The method of claim 1, wherein:
   the first set of the plurality of tracks comprise representative tracks associated with the generated playlist associated with the user, and represent the one or more playlist criteria specified by the user; and the second set of the plurality of tracks comprise representative tracks associated with a generated playlist associated with the other user, and represent the one or more playlist criteria specified by the other user.

4. The method of claim 1, wherein:

the first set of tracks comprise upcoming tracks of the generated playlist associated with the user; and the second set of tracks comprise upcoming tracks of the other playlist associated with the other user.

5. The method of claim 1, wherein the value of the first playlist criterion from the one or more playlist criteria specified by the user is different from the value of the second playlist criterion from the one or more playlist criteria specified by the other user.

6. The method of claim 1, wherein the plurality of visual representations of the one or more playlist criteria include at least two representations of two playlist criteria specified by the user, and at least two representations of two playlist criteria specified by the other user and corresponding to the at least two playlist criteria used for selecting the tracks for the generated playlist associated with the user.

7. The method of claim 6, further comprising:

while displaying the second playlist user interface, receiving a second touch input on the touch-sensitive surface corresponding to movement of the first visual representation of the first playlist criterion or a movement of a third visual representation of a third playlist criterion of the two playlist criteria specified by the user; and in response to receiving the second touch input:

in accordance with a determination that the second touch input corresponds to the movement of the first visual representation of the first playlist criterion, displaying the first visual representation at a first updated position on the display, and adjusting the value of the first playlist criterion based on the movement of the first visual representation; and in accordance with a determination that the second touch input corresponds to the movement of the second visual representation of the first playlist criterion, displaying the second visual representation at a second updated position on the display, and adjusting the value of the second playlist criterion based on the movement of the first visual representation.

8. The method of claim 7, wherein displaying the first visual representation comprises:

displaying a color over an area of the display, where an intensity of the color or a magnitude of the area is adjustable, and is based on the value of the first playlist criterion from the one or more playlist criteria specified by the user.

9. The method of claim 7, wherein displaying the first visual representation comprises:

displaying a geometric shape on the display, where sizes or dimensions of the geometric shape are adjustable, and are based on the value of the first playlist criterion from the one or more playlist criteria specified by the user.

10. The method of claim 1, further comprising:

receiving additional touch input from the user, the additional touch input comprising dragging a first visual representation of a particular track from the plurality of visual representations of the second set of tracks into the plurality of visual representations of the first set of tracks; and in response to receiving the additional touch input:

updating the plurality of visual representations of the first set of tracks, including adding the particular track to the generated playlist associated with the user.

11. The method of claim 10, wherein updating the plurality of visual representations of the first set of tracks comprises:

including a visual representation of the particular track from the other playlist associated with the other user in the plurality of visual representations of the first set of tracks, and removing a visual representation of a first track of the first set of tracks of the generated playlist associated with the user in the plurality of visual representations of the first set of tracks, while maintaining a visual representation of a second track of the first set of tracks of the generated playlist associated with the user in the plurality of visual representations of the first set of tracks.

12. The method of claim 11, further comprising in response to receiving the additional touch input:

adjusting the one or more playlist criteria specified by the user to account for removal of the first track of the first set of tracks from the generated playlist in response to receiving the additional touch input.

13. The method of claim 10, further comprising in response to receiving the additional touch input:

adjusting the one or more playlist criteria specified by the user to account for addition of the particular track to the first set of tracks from the generated playlist in response to receiving the additional touch input.

14. The method of claim 1, wherein the touch input comprises a first touch input, and displaying the second playlist user interface includes:

selecting, based on the one or more playlist criteria, one or more tracks of the second set of the plurality of tracks, including comparing the one or more tracks from the second set of the plurality of tracks with the one or more playlist criteria specified by the user; and displaying, via the display, the second playlist user interface, comprising:

the plurality of visual representations of the first set of the plurality of tracks; and the plurality of visual representations of the second set of the plurality of tracks, including the one or more tracks of the second set of the plurality of tracks as selected by comparing the one or more tracks from the second set of the plurality of tracks with the one or more playlist criteria specified by the user.

15. The method of claim 1, wherein the touch input comprises a first touch input, and displaying the second playlist user interface includes:

selecting, based on one or more tracks from the first set of the plurality of tracks, one or more tracks of the second set of the plurality of tracks, including comparing the one or more tracks from the first set of the plurality of tracks with the one or more tracks of the second set of the plurality of tracks; and displaying, via the display, the second playlist user interface, comprising:

the plurality of visual representations of the first set of the plurality of tracks; and the plurality of visual representations of the second set of the plurality of tracks, including the one or more tracks of the second set of the plurality of tracks as selected by comparing the one or more tracks of the second set of the plurality of tracks with the one or more tracks from the first set of the plurality of tracks.

16. An electronic device comprising:
one or more processors;
a display;
a touch-sensitive surface;
one or more input devices; and
a non-transitory computer-readable medium including one or more sequences of instructions which, when executed by the one or more processors, cause the one or more processors to perform a method comprising:
   displaying, via the display, a first playlist user interface having at least one representation of a generated playlist associated with a user, with tracks for the generated playlist being selected based on one or more playlist criteria specified by the user;
   while displaying the first playlist user interface, receiving a touch input on the touch-sensitive surface; and
   in response to receiving the touch input, displaying, via the display, a second playlist user interface, comprising concurrently displaying in the second playlist user interface:
      a plurality of visual representations of a first set of a plurality of tracks associated with the generated playlist associated with the user;
      a plurality of visual representations of a second set of a plurality of tracks associated with an other playlist associated with an other user; and
      a plurality of visual representations of one or more playlist criteria, including:
         a first visual representation indicating a value of a first playlist criterion from the one or more playlist criteria specified by the user, wherein the value of the first playlist criterion corresponds to a first measure of a musical characteristic associated with one or more tracks from the first set of the plurality of tracks; and
         a second visual representation indicating a value of a second playlist criterion from one or more playlist criteria specified by the other user, wherein the value of the second playlist criterion corresponds to a second measure of the musical characteristic associated with one or more tracks from the second set of the plurality of tracks, and the second set of the plurality of tracks are selected based on the one or more playlist criteria specified by the other user.

17. The electronic device of claim 16, wherein the user comprises a first user, the generated playlist associated with the user comprises a first generated playlist, wherein the other user comprises a second user, the other playlist associated with the other user comprises a second generated playlist, and wherein the second playlist user interface comprises:
   a plurality of visual representations of a third set of a plurality of tracks associated with a third playlist associated with a different user than the user and the other user.

18. The electronic device of claim 16, wherein:
   the first set of the plurality of tracks comprise representative tracks associated with the generated playlist associated with the user, and represent the one or more playlist criteria specified by the user; and
   the second set of the plurality of tracks comprise representative tracks associated with a generated playlist associated with the other user, and represent the one or more playlist criteria specified by the other user.

19. The electronic device of claim 16, wherein:
   the first set of tracks comprise upcoming tracks of the generated playlist associated with the user; and
   the second set of tracks comprise upcoming tracks of the other playlist associated with the other user.

20. The electronic device of claim 16, wherein the value of the first playlist criterion from the one or more playlist criteria specified by the user is different from the value of the second playlist criterion from the one or more playlist criteria specified by the other user.

21. The electronic device of claim 16, wherein the plurality of visual representations of the one or more playlist criteria include at least two representations of two playlist criteria specified by the user, and at least two representations of two playlist criteria specified by the other user and corresponding to the at least two playlist criteria used for selecting the tracks for the generated playlist associated with the user.

22. The electronic device of claim 21, the method further comprising:
   while displaying the second playlist user interface, receiving a second touch input on the touch-sensitive surface corresponding to movement of the first visual representation of the first playlist criterion or a movement of a third visual representation of a third playlist criterion of the two playlist criteria specified by the user; and
   in response to receiving the second touch input:
      in accordance with a determination that the second touch input corresponds to the movement of the first visual representation of the first playlist criterion, displaying the first visual representation at a first updated position on the display, and adjusting the value of the first playlist criterion based on the movement of the first visual representation; and
      in accordance with a determination that the second touch input corresponds to the movement of the second visual representation of the first playlist criterion, displaying the second visual representation at a second updated position on the display, and adjusting the value of the second playlist criterion based on the movement of the first visual representation.

23. The electronic device of claim 22, wherein displaying the first visual representation comprises:
   displaying a color over an area of the display, where an intensity of the color or a magnitude of the area is adjustable, and is based on the value of the first playlist criterion from the one or more playlist criteria specified by the user.

24. The electronic device of claim 22, wherein displaying the first visual representation comprises:
   displaying a geometric shape on the display, where sizes or dimensions of the geometric shape are adjustable, and are based on the value of the first playlist criterion from the one or more playlist criteria specified by the user.

25. The electronic device of claim 16, the method further comprising:
   receiving additional touch input from the user, the additional touch input comprising dragging a first visual representation of a particular track from the plurality of visual representations of the second set of tracks into the plurality of visual representations of the first set of tracks; and
   in response to receiving the additional touch input:

updating the plurality of visual representations of the first set of tracks, including adding the particular track to the generated playlist associated with the user.

26. The electronic device of claim 25, wherein updating the plurality of visual representations of the first set of tracks comprises:
including a visual representation of the particular track from the other playlist associated with the other user in the plurality of visual representations of the first set of tracks, and removing a visual representation of a first track of the first set of tracks of the generated playlist associated with the user in the plurality of visual representations of the first set of tracks, while maintaining a visual representation of a second track of the first set of tracks of the generated playlist associated with the user in the plurality of visual representations of the first set of tracks.

27. The electronic device of claim 26, the method further comprising in response to receiving the additional touch input:
adjusting the one or more playlist criteria specified by the user to account for removal of the first track of the first set of tracks from the generated playlist in response to receiving the additional touch input.

28. The electronic device of claim 25, the method further comprising in response to receiving the additional touch input:
adjusting the one or more playlist criteria specified by the user to account for addition of the particular track to the first set of tracks from the generated playlist in response to receiving the additional touch input.

29. The electronic device of claim 16, wherein the touch input comprises a first touch input, and displaying the second playlist user interface includes:
selecting, based on the one or more playlist criteria, one or more tracks of the second set of the plurality of tracks, including comparing the one or more tracks from the second set of the plurality of tracks with the one or more playlist criteria specified by the user; and
displaying, via the display, the second playlist user interface, comprising:
the plurality of visual representations of the first set of the plurality of tracks; and
the plurality of visual representations of the second set of the plurality of tracks, including the one or more tracks of the second set of the plurality of tracks as selected by comparing the one or more tracks from the second set of the plurality of tracks with the one or more playlist criteria specified by the user.

30. The electronic device of claim 16, wherein the touch input comprises a first touch input, and displaying the second playlist user interface includes:
selecting, based on one or more tracks from the first set of the plurality of tracks, one or more tracks of the second set of the plurality of tracks, including comparing the one or more tracks from the first set of the plurality of tracks with the one or more tracks of the second set of the plurality of tracks; and
displaying, via the display, the second playlist user interface, comprising:
the plurality of visual representations of the first set of the plurality of tracks; and
the plurality of visual representations of the second set of the plurality of tracks, including the one or more tracks of the second set of the plurality of tracks as selected by comparing the one or more tracks of the second set of the plurality of tracks with the one or more tracks from the first set of the plurality of tracks.

31. A non-transitory computer-readable medium including one or more sequences of instructions which, when executed by one or more processors of an electronic device with a display and one or more input devices, cause the one or more processors to perform a method comprising:
displaying, via the display, a first playlist user interface having at least one representation of a generated playlist associated with a user, with tracks for the generated playlist being selected based on one or more playlist criteria specified by the user;
while displaying the first playlist user interface, receiving a touch input on a touch-sensitive surface; and
in response to receiving the touch input, displaying, via the display, a second playlist user interface, comprising concurrently displaying in the second playlist user interface:
a plurality of visual representations of a first set of a plurality of tracks associated with the generated playlist associated with the user;
a plurality of visual representations of a second set of a plurality of tracks associated with an other playlist associated with an other user; and
a plurality of visual representations of one or more playlist criteria, including:
a first visual representation indicating a value of a first playlist criterion from the one or more playlist criteria specified by the user, wherein the value of the first playlist criterion corresponds to a first measure of a musical characteristic associated with one or more tracks from the first set of the plurality of tracks; and
a second visual representation indicating a value of a second playlist criterion from one or more playlist criteria specified by the other user, wherein the value of the second playlist criterion corresponds to a second measure of the musical characteristic associated with one or more tracks from the second set of the plurality of tracks, and the second set of the plurality of tracks are selected based on the one or more playlist criteria specified by the other user.

32. The non-transitory computer-readable medium of claim 31, wherein the user comprises a first user, the generated playlist associated with the user comprises a first generated playlist, wherein the other user comprises a second user, the other playlist associated with the other user comprises a second generated playlist, and wherein the second playlist user interface comprises:
a plurality of visual representations of a third set of a plurality of tracks associated with a third playlist associated with a different user than the user and the other user.

33. The non-transitory computer-readable medium of claim 31, wherein:
the first set of the plurality of tracks comprise representative tracks associated with the generated playlist associated with the user, and represent the one or more playlist criteria specified by the user; and
the second set of the plurality of tracks comprise representative tracks associated with a generated playlist associated with the other user, and represent the one or more playlist criteria specified by the other user.

34. The non-transitory computer-readable medium of claim 31, wherein:

the first set of tracks comprise upcoming tracks of the generated playlist associated with the user; and the second set of tracks comprise upcoming tracks of the other playlist associated with the other user.

35. The non-transitory computer-readable medium of claim 31, wherein the value of the first playlist criterion from the one or more playlist criteria specified by the user is different from the value of the second playlist criterion from the one or more playlist criteria specified by the other user.

36. The non-transitory computer-readable medium of claim 31, wherein the plurality of visual representations of the one or more playlist criteria include at least two representations of two playlist criteria specified by the user, and at least two representations of two playlist criteria specified by the other user and corresponding to the at least two playlist criteria used for selecting the tracks for the generated playlist associated with the user.

37. The non-transitory computer-readable medium of claim 36, the method further comprising:

while displaying the second playlist user interface, receiving a second touch input on the touch-sensitive surface corresponding to movement of the first visual representation of the first playlist criterion or a movement of a third visual representation of a third playlist criterion of the two playlist criteria specified by the user; and in response to receiving the second touch input:

in accordance with a determination that the second touch input corresponds to the movement of the first visual representation of the first playlist criterion, displaying the first visual representation at a first updated position on the display, and adjusting the value of the first playlist criterion based on the movement of the first visual representation; and in accordance with a determination that the second touch input corresponds to the movement of the second visual representation of the first playlist criterion, displaying the second visual representation at a second updated position on the display, and adjusting the value of the second playlist criterion based on the movement of the first visual representation.

38. The non-transitory computer-readable medium of claim 37, wherein displaying the first visual representation comprises:

displaying a color over an area of the display, where an intensity of the color or a magnitude of the area is adjustable, and is based on the value of the first playlist criterion from the one or more playlist criteria specified by the user.

39. The non-transitory computer-readable medium of claim 37, wherein displaying the first visual representation comprises:

displaying a geometric shape on the display, where sizes or dimensions of the geometric shape are adjustable, and are based on the value of the first playlist criterion from the one or more playlist criteria specified by the user.

40. The non-transitory computer-readable medium of claim 31, the method further comprising:

receiving additional touch input from the user, the additional touch input comprising dragging a first visual representation of a particular track from the plurality of visual representations of the second set of tracks into the plurality of visual representations of the first set of tracks; and in response to receiving the additional touch input:

updating the plurality of visual representations of the first set of tracks, including adding the particular track to the generated playlist associated with the user.

41. The non-transitory computer-readable medium of claim 40, wherein updating the plurality of visual representations of the first set of tracks comprises:

including a visual representation of the particular track from the other playlist associated with the other user in the plurality of visual representations of the first set of tracks. and removing a visual representation of a first track of the first set of tracks of the generated playlist associated with the user in the plurality of visual representations of the first set of tracks, while maintaining a visual representation of a second track of the first set of tracks of the generated playlist associated with the user in the plurality of visual representations of the first set of tracks.

42. The non-transitory computer-readable medium of claim 41, the method further comprising in response to receiving the additional touch input:

adjusting the one or more playlist criteria specified by the user to account for removal of the first track of the first set of tracks from the generated playlist in response to receiving the additional touch input.

43. The non-transitory computer-readable medium of claim 40, the method further comprising in response to receiving the additional touch input:

adjusting the one or more playlist criteria specified by the user to account for addition of the particular track to the first set of tracks from the generated playlist in response to receiving the additional touch input.

44. The non-transitory computer-readable medium of claim 31, wherein the touch input comprises a first touch input, and displaying the second playlist user interface includes:

selecting, based on the one or more playlist criteria, one or more tracks of the second set of the plurality of tracks, including comparing the one or more tracks from the second set of the plurality of tracks with the one or more playlist criteria specified by the user; and displaying, via the display, the second playlist user interface, comprising:

the plurality of visual representations of the first set of the plurality of tracks; and the plurality of visual representations of the second set of the plurality of tracks, including the one or more tracks of the second set of the plurality of tracks as selected by comparing the one or more tracks from the second set of the plurality of tracks with the one or more playlist criteria specified by the user.

45. The non-transitory computer-readable medium of claim 31, wherein the touch input comprises a first touch input, and displaying the second playlist user interface includes:

selecting, based on one or more tracks from the first set of the plurality of tracks, one or more tracks of the second set of the plurality of tracks, including comparing the one or more tracks from the first set of the plurality of tracks with the one or more tracks of the second set of the plurality of tracks; and displaying, via the display, the second playlist user interface, comprising:

the plurality of visual representations of the first set of the plurality of tracks; and the plurality of visual representations of the second set of the plurality of tracks, including the one or more tracks of the second set of the plurality of tracks as selected by comparing the one or more tracks of the second set of the plurality of tracks with the one or more tracks from the first set of the plurality of tracks.

* * * * *